(12) United States Patent
Vanderstraten et al.

(10) Patent No.: US 7,757,407 B2
(45) Date of Patent: Jul. 20, 2010

(54) GAS DRYING DEVICE

(75) Inventors: Bart Etienne Agnes Vanderstraten, Haacht (BE); Ben Paul Karl Van Hove, Antwerp (BE)

(73) Assignee: ATLAS COPCO AIRPOWER, naamloze vennootschap, Wilrijk (BE)

( * ) Notice: Subject to any disclaimer, the term of this patent is extended or adjusted under 35 U.S.C. 154(b) by 0 days.

(21) Appl. No.: 11/883,362

(22) PCT Filed: Jan. 26, 2006

(86) PCT No.: PCT/BE2006/000006

§ 371 (c)(1),
(2), (4) Date: Jul. 31, 2007

(87) PCT Pub. No.: WO2006/081635

PCT Pub. Date: Aug. 10, 2006

(65) Prior Publication Data

US 2008/0256820 A1    Oct. 23, 2008

(30) Foreign Application Priority Data

Feb. 1, 2005    (BE)    ................................. 2005/0054

(51) Int. Cl.
*B01D 53/26* (2006.01)

(52) U.S. Cl. ........................ 34/74; 34/77; 34/78; 34/80; 34/95

(58) Field of Classification Search ...................... 34/72, 34/73, 74, 76, 77, 78, 79, 80, 95, 329, 330, 34/467, 473; 96/125, 126, 127, 128, 130, 96/150; 62/238.6
See application file for complete search history.

(56) References Cited

U.S. PATENT DOCUMENTS

| | | | | |
|---|---|---|---|---|
| 3,374,642 A * | 3/1968 | McMinn | ....................... | 62/115 |
| 3,807,053 A | 4/1974 | Sylvan et al. | | |
| 5,385,603 A | 1/1995 | Sienack | | |
| 5,403,384 A * | 4/1995 | Faul et al. | ....................... | 96/128 |
| 5,454,228 A * | 10/1995 | Yang et al. | ..................... | 62/113 |
| 5,584,190 A * | 12/1996 | Cole | ........................... | 62/260 |
| 6,478,857 B2 * | 11/2002 | Czabala | ........................ | 96/130 |
| 6,817,198 B2 * | 11/2004 | Wilson et al. | .............. | 62/228.3 |
| 7,118,721 B2 * | 10/2006 | Rini et al. | ................. | 423/239.1 |
| 2004/0079121 A1 * | 4/2004 | Yabuuchi et al. | ............. | 68/19.2 |

FOREIGN PATENT DOCUMENTS

| | | |
|---|---|---|
| CH | 691 349 A5 | 7/2001 |
| DE | 93 05 296 U | 2/1994 |
| EP | 0 566 180 A | 10/1993 |

* cited by examiner

*Primary Examiner*—Jiping Lu
(74) *Attorney, Agent, or Firm*—Bacon & Thomas, PLLC

(57) ABSTRACT

Gas drying device, consisting of a desiccant dryer (2) which makes use of a pressure tank (4) with a drying zone (5) and a regeneration zone (6), with an adsorption and/or absorption medium (7) which is alternately guided through the drying zone (5) and the regeneration zone (6); a primary circuit (8) in which the abovementioned desiccant dryer (2) is included, which makes it possible to guide the gas to be dried through the drying zone (5) of the desiccant dryer (2); a secondary circuit (9) which makes it possible for a part of the gas to be dried to be guided through the regeneration zone (6) of the desiccant dryer (2) and to absorb moisture there, characterized in that the device also contains a cooling dryer (1) which is inserted upstream the abovementioned desiccant dryer (2) in the primary circuit (8).

10 Claims, 2 Drawing Sheets

GAS DRYING DEVICE

The present invention concerns a device for drying gas, in particular for drying a compressed gas.

In particular, the invention concerns a device for drying a gas, which device contains what is called a desiccant dryer which makes use of a pressure tank with a drying zone and a regeneration zone, which tank is equipped with an adsorption and/or absorption medium which is alternately guided through the drying zone and the regeneration zone.

A known problem with such devices is that under extreme environmental conditions occurring for example in the tropics, the gas is not always sufficiently dried for all required applications.

At a high temperature and high humidity, the regeneration capacity of such a desiccant dryer is exceeded indeed.

Apart from the desiccant dryers, also cooling dryers are well known, but cool drying under tropical circumstances is not efficient either and results in an undesirably high energy consumption.

In order to make such a desiccant dryer useful under tropical conditions as well, the invention provides for a gas drying device consisting of the type which makes use of a pressure tank with a drying zone and a regeneration zone, with an adsorption and/or absorption medium which is alternately guided through the drying zone and the regeneration zone; a primary circuit in which the above-mentioned desiccant dryer is included, which makes it possible to guide the gas to be dried through the drying zone of the desiccant dryer; a secondary circuit which makes it possible for a part of the gas to be dried to be guided through the regeneration zone of the desiccant dryer and to absorb moisture there, whereby the device also contains a cooling dryer which is inserted upstream the above-mentioned desiccant dryer in the primary circuit.

An advantage of such a device according to the invention is that the gas to be dried can be strongly cooled and partly dried before being guided through the desiccant dryer, as a result of which the desiccant dryer is relieved and can function efficiently without being saturated under extremely damp and humid conditions.

The device according to the invention can provide for dried gas any time, which gas meets the highest requirements, and with an acceptable consumption of energy.

Figure 1:
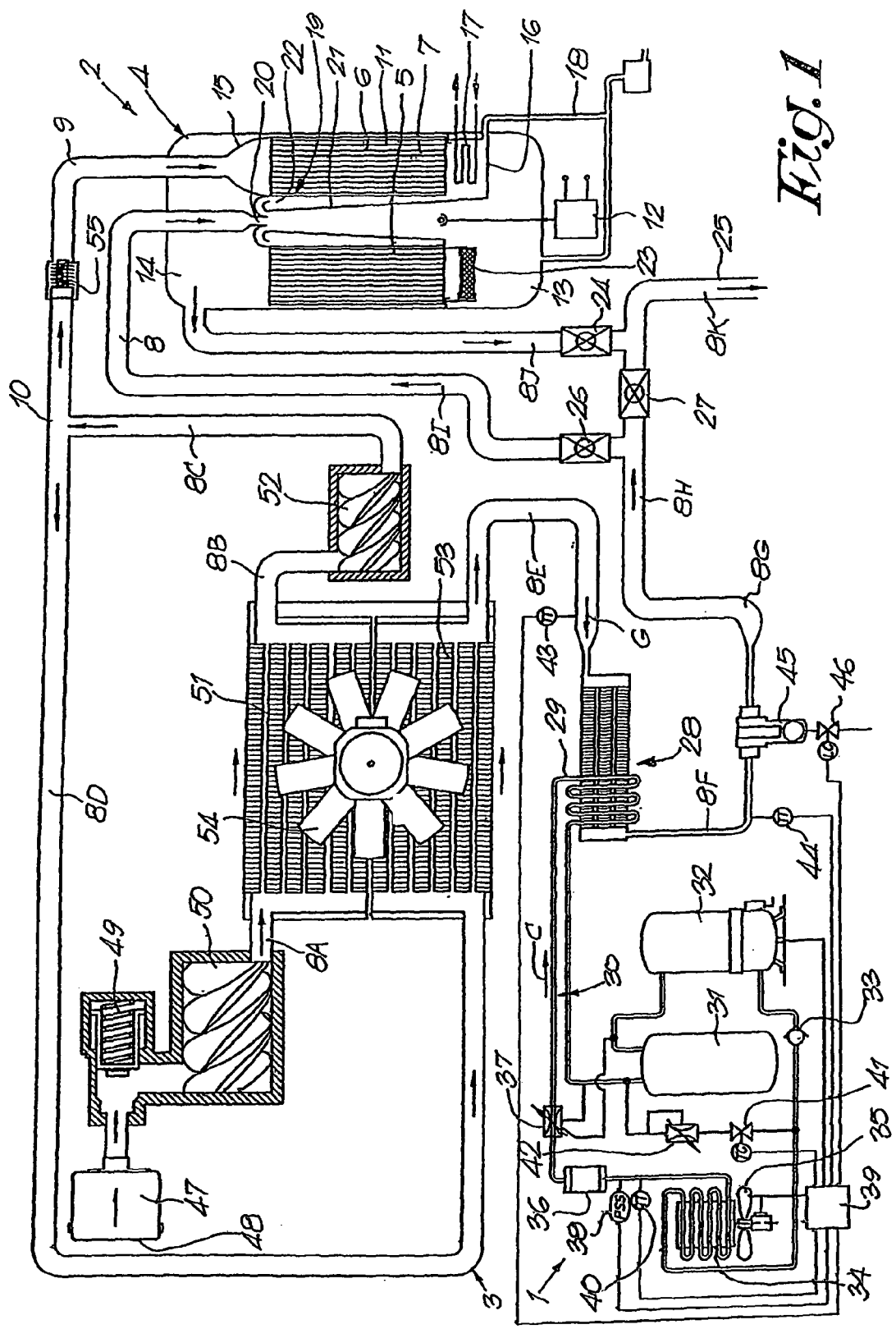
Figure 2:
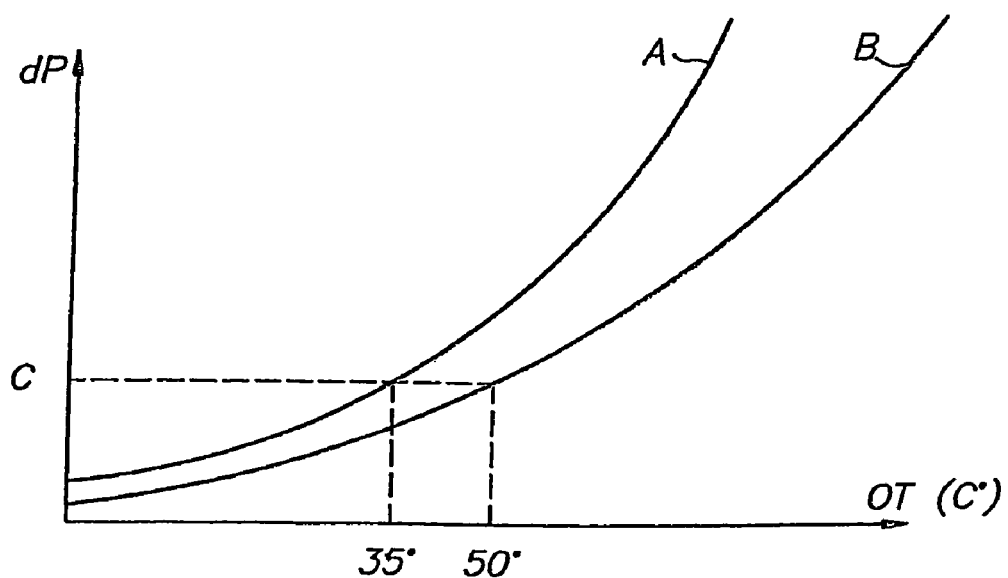
Figure 3:
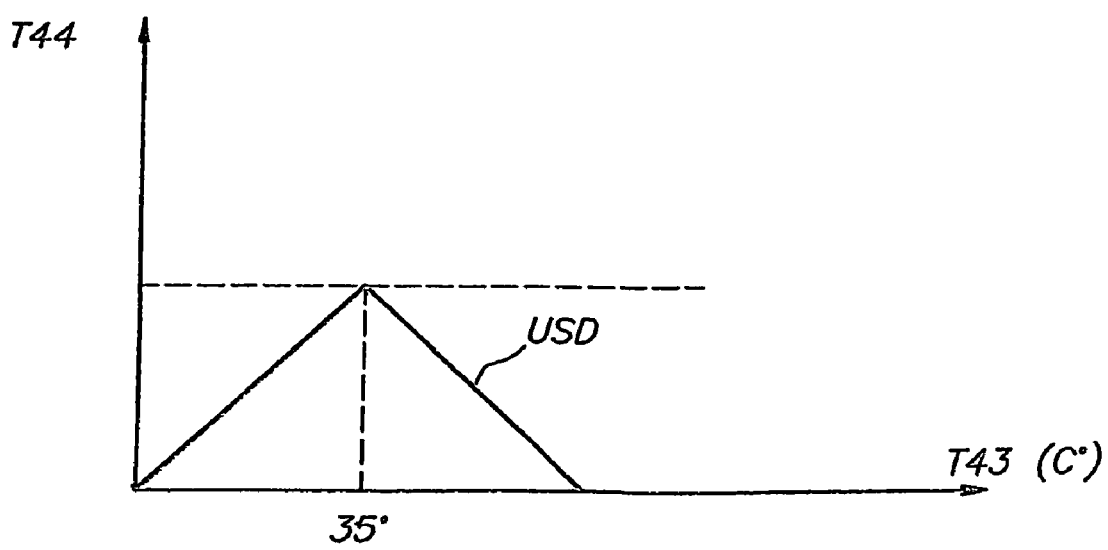

In order to better explain the characteristics of the invention, the following preferred embodiment of a gas drying device according to the invention is given as an example only without being limitative in any way, with reference to the accompanying drawings, in which:

FIG. 1 schematically represents a gas drying device according to the invention;

FIGS. 2 and 3 each represent a graph illustrating the working of the device according to the invention.

The gas drying device, as represented in FIG. 1, mainly comprises a cooling dryer 1, a desiccant dryer 2, and in this embodiment also a compressor part 3.

The desiccant dryer 2 is of the type which makes use of a pressure tank 4 with a drying zone 5 and a regeneration zone 6 with an adsorption and/or absorption medium 7 which is alternately guided through the drying zone 5 and the regeneration zone 6.

Further, the device comprises a primary circuit 8 containing a pipe with parts 8A, 8B, 8C, 8D, 8E, 8F, 8G, 8H, 8I, 8J and 8K, in which the above-mentioned cooling dryer 1, the above-mentioned desiccant dryer 2 and the above-mentioned compressor part 3 are inserted, and which makes it possible for the gas to be dried to be first compressed, to be then at least partly dried in the cooling dryer 1, and to be subsequently guided through the drying zone 5 of the desiccant dryer 2 to be further dried.

The device also comprises a secondary circuit 9 which, as of a bifurcation 10 in the compressor part 3, makes it possible for a part of the gas to be dried to be guided through the regeneration zone 6 of the desiccant dryer 2 and to absorb moisture from the adsorption and absorption medium 7 there.

The desiccant dryer 2 has a rotor 11 which mainly consists of a cylindrical drying element which is formed of the above-mentioned adsorption and absorption medium 7.

The rotor 11 is driven at a low rotational speed of for example seven rotations per hour by means of a motor 12, possibly equipped with a transmission.

The desiccant dryer 2 has a wet space 13 and a dry space 14 which are adjacent to the inlet and the outlet respectively of the drying zone 5.

A sector of the rotor 11 is protected near its axial ends, for example by means of screens 15 and 16, such that in the desiccant dryer 2, next to the wet space 13 and the dry space 14, is formed a regeneration zone 6. The remaining part of the rotor 11 then forms the drying zone 5. In the space which is delimited by the screen 16 is provided a cooler 17, for example an air cooler or a liquid cooler, and a drain pipe 18 for moisture.

In the desiccant dryer 2, in particular centrally inside the rotor 11, is provided a mixing device 19, for example of the type as described in Belgian patent No. 1,005,764, mainly formed of a jet pipe 20, a mixing pipe 21 and a suction opening 22.

At the inlet of the drying zone 5 is provided a liquid separator 23 in this embodiment. At the bottom, the tank 4 is also provided with a drain pipe 18 for moisture.

At the dry zone 14, the pressure tank 4 is provided with a connection to the primary circuit 8 which leads further downstream to the drain 25 of the device via a valve 24.

Upstream the desiccant dryer 2 is in the first place provided a valve 26, in particular in the primary circuit 8, and further upstream is provided the above-mentioned cooling dryer 1 according to the invention.

Moreover, the part 8H of the primary circuit 8 between the cooling dryer 1 and the valve 26 is directly connected to the drain 25, but via a valve 27.

As is known, the cooling dryer 1 mainly consists of a heat exchanger 28 whose primary part forms the evaporator 29 of a cooling circuit 30 which is filled with coolant, for example Freon 404a, whose flow direction is represented by arrow C.

In the cooling circuit 30, downstream the heat exchanger 28, are successively provided a liquid separator 31, a compressor 32, a non-return valve 33, a condenser 34 with a fan 35, a coolant filter/dryer 36 and an adjustable thermostatic throttle valve 37.

This adjustable thermostatic throttle valve 37 is also connected to a connecting point in the cooling circuit 30, downstream in relation to the evaporator 29. Downstream the liquid separator 31 is measured a temperature signal which is used as a control signal.

Upstream the filter/dryer 36 may be provided a pressure/shut-off switch 38 which is connected to a control unit 39. Near the above-mentioned pressure/shut-off switch 38 is provided a temperature measuring point 40 in the given embodiment which is also connected to the control unit 39.

The cooling circuit 30 is connected upstream the condenser 34, however via a shut-off valve 41 and a by-pass valve 42, to the part of the cooling circuit 30 upstream the above-mentioned liquid separator 31, or in other words the evaporator circuit.

The shut-off valve 41 is electrically connected to the control unit 39. Moreover, the control unit 39 is connected to a measuring point 43 which registers the temperature of the gas to be dried between the pre-cooler 53 and the heat exchanger 28.

Through the secondary part of the heat exchanger 28 flows the gas to be dried in the flow direction as represented by arrow G. Downstream the heat exchanger 28 is provided a measuring point 44 which measures the temperature of the gas to be dried, and further downstream is provided a water separator 45 with an electronic water discharge 46, which are both electrically connected to the control unit 39.

Finally, the control unit 39 is also connected to the fan 35 of the condenser 34, in this case air-cooled, on the one hand, and to the compressor 32 on the other hand.

Upstream the secondary part of the heat exchanger 28 in the primary circuit 8, is provided the above-mentioned compressor part 3, which consists of a filter 47 with an intake 48, followed by an adjustable inlet valve 49, a double stage compressor consisting of a first compressor element 50, an intercooler 51, and a second compressor element 52.

Further downstream the double stage compressor, the primary circuit 8 continues with the pipe part 8C, which changes in the pipe part 8D after the bifurcation 10 which carries the gas to be dried to a pre-cooler 53.

In this embodiment, the intercooler 51 and the pre-cooler 53 have moreover been integrated, and both are provided with one common fan 54.

Between the bifurcation 10 and the pressure tank 4 is provided a non-return valve 55.

The working of the gas drying device, as described above, is simple and as follows.

The gas to be dried, for example air, is sucked in via the intake 48 and guided through the filter 47.

The first compressor element 50 increases the gas pressure, after which the gas is cooled in the intercooler 51, and after which the gas pressure is further increased in the compressor element 52.

At the bifurcation 10, a fraction of the gas to be dried is led away to the secondary circuit 9, whereas the major par of the gas to be dried is guided further in the primary circuit 8 through the pre-cooler 53.

Further downstream the primary circuit 8, the gas to be dried is cooled in the heat exchanger 28 of the cooling dryer 1 to, for example in the case of air, a temperature of some 30° C. below the starting temperature of the pre-cooler 53. Part of the moisture is separated from the air in the water separator 45 with the electronic water discharge 46.

Next, the gas to be dried is carried further downstream the primary circuit 8, to the valves 26 and 27 which give access to the desiccant dryer 2, to the drain 25 respectively.

In case of a closed valve 27 and an open valve 26, the gas to be dried is guided into the desiccant dryer 2, where the gas to be dried is guided down through the mixing pipe 21 of the mixing device 19.

In the liquid separator 23, a first fraction of the moisture is separated from the gas to be dried, and this moisture is discharged via the drain pipe 18.

The flow of gas to be dried is carried further up through the drying zone 5 of the rotor 11. The adsorption and/or absorption medium 7 is not saturated, since the rotor 11 is continuously turned, or at least at regular points in time, so that a sector of the rotor 11 is each time placed in the regeneration zone 6. As a result, the gas to be dried is further dried since there is a deposit of moisture in the drying zone 5 of the rotor 11.

The gas to be dried is then maximally dried and is guided further, via the dry zone 14 in the pressure tank 4 and via the continuation of the primary circuit 8 and the valve 24, to the drain 25 of the device.

The fraction of the gas to be dried which is guided through the secondary circuit 9 in the bifurcation 10 is guided via the non-return valve 55 in the regeneration zone 6 of the rotor 11, where the gas absorbs moisture which has first been adsorbed by the adsorption and/or absorption medium 7, in particular when this sector of the rotor 11 was situated in the drying zone 5.

This fraction of damp gas is partly dried as it is first cooled in the cooler 17 where the condensed moisture is discharged via the drain pipe 18.

Next, this fraction of gas is carried up to the suction opening 22 and sucked into the mixing device 19 where this fraction of gas coming from the secondary circuit is mixed with the fraction of the gas to be dried from the primary circuit 8.

It is clear that the secondary circuit 9 must not necessarily be split from the primary circuit 8, but that it may also consist of an independent gas flow which is used each time to dry the moistened adsorption and/or absorption medium 7.

Naturally, many parameters in the device are adjustable, such as for example the speed of revolution of the motor 12 and the cooling capacity of the cooler 17 and of the cooling dryer 1, and measuring instruments and control circuits can be provided for optimisation.

Also the inlet temperature of the gas to be dried at the jet pipe 20 or upstream thereof, at the part 8I of the primary circuit, can be adjusted.

It is clear that the cooling dryer 1 with the above-mentioned control unit 39 offers many possibilities for the control of the latter inlet temperature and of the device according to the invention in general.

Thus, the rotational speed of the cooling dryer 1 can be adjusted, as a result of which gas or air with the required dew point can be obtained in an energy-saving manner, even under tropical conditions.

Indeed, by switching on the speed-controlled cooling dryer 1, the field of activity is considerably expanded to higher ambient temperatures.

Preferably, the cooling dryer 1 is only switched on as of an ambient temperature whereby the desiccant dryer 2 can no longer dry the air to be dried to the intended dew point, for example as of an ambient temperature of 35° C.

The cooling dryer 1 must not immediately work at full capacity, but it can be excited in a steady manner in view of obtaining dried air with an intended dew point, with a minimal consumption of energy.

Partly thanks to the temperature measurements 43 and 44, the device according to the invention can produce dried air or gas with an intended maximum dew point in a wider range of ambient temperatures and in an energy-saving manner. The speed-controlled cooling dryer 1 hereby cools the air to be dried with an appropriate intensity.

FIGS. 2 and 3 will illustrate a few things, whereby FIG. 2 represents the dew point dP realised with the device as a function of the ambient temperature OT.

Curve A represents the course of the dew point as a function of the ambient temperature for a device as discussed above, but without activating the cooling dryer 1.

Curve B represents the course of the dew point as a function of the ambient temperature for a device as discussed above, whereby the cooling dryer 1 is excited completely.

It is clear that the intended dew point C can be obtained as of a certain ambient temperature, as of 35° C. in the given curve, by controlling the cooling dryer 1 with the appropriate excitation.

FIG. 3 illustrates how the temperature T44 in the measuring point 44 changes as a function of the temperature T33 in the measuring point 43 when the cooling dryer 1 is controlled as described above.

In general, the temperature in measuring point 43 changes in proportion to the ambient temperature, and it will be situated some 8° C. above the ambient temperature in particular.

Indeed, the temperature in the measuring point 44 practically corresponds to the temperature in the measuring point 43, as long as the cooling dryer 1 is not excited, or in the given example up to an ambient temperature of 35° C.

As the cooling dryer 1 is excited some more, the temperature in the measuring point 44 decreases.

The present invention is by no means limited to the embodiment given as an example and represented in the accompanying drawings; on the contrary, such a gas drying device can be made according to several variants while still remaining within the scope of the invention.

The invention claimed is:

1. Gas drying device, comprising a desiccant dryer including a pressure tank with a drying zone and a regeneration zone, and an adsorption and/or absorption medium which is alternately guided through the drying zone and the regeneration zone; a primary circuit which includes the desiccant dryer, said primary circuit enabling the gas to be dried to be passed through the drying zone of the desiccant dryer; a secondary circuit enabling a part of the gas to be dried to be guided through the regeneration zone of the desiccant dryer for the absorption of moisture; and a cooling dryer which is disposed upstream the desiccant dryer in the primary circuit;

wherein the cooling dryer comprises a closed cooling circuit upstream the desiccant dryer, the closed cooling circuit having a compressor, a condenser, and an evaporator defining a primary part of a heat exchanger; and a secondary part of the heat exchanger functions to cool the gas to be dried;

wherein upstream of the heat exchanger is provided a first temperature measuring point which registers the temperature of the gas to be dried upstream the heat exchanger;

wherein downstream of the heat exchanger is provided a second temperature measuring point which measures the temperature of the gas to be dried downstream the heat exchanger;

wherein due at least in part to the first and second temperature measuring points, the gas drying device can produce dried gas with an intended maximum dew point in a wider range of ambient temperatures and in an energy-saving manner;

wherein the closed cooling circuit further comprises a throttle valve positioned between an inlet of the evaporator and an outlet of the condenser;

wherein the closed cooling circuit further comprises a liquid separator and a control unit, wherein a temperature signal is measured downstream of the liquid separator and is used as a control signal; and wherein said gas drying device further comprises a coolant filter/dryer provided downstream of the heat exchanger, a pressure/shut-off switch provided upstream the filter/dryer, and a third temperature measuring point provided near the pressure/shut-off switch and connected to the control unit.

2. Gas drying device according to claim 1, wherein the cooling dryer further comprises a water separator.

3. Gas drying device according to claim 2, wherein the compressor of the cooling circuit is a compressor with variable speed control.

4. Gas drying device according to claim 1, wherein the desiccant dryer comprises a cooler which provides at least for the cooling of the gas from the secondary circuit for separating out liquid.

5. Gas drying device according to claim 1, wherein the desiccant dryer comprises a mixing device arranged to mix the gas from the secondary circuit with the gas from the primary circuit.

6. Gas drying device according to claim 5, wherein the mixing device is integrated in the desiccant dryer.

7. Gas drying device according to claim 1, wherein upstream of the cooling dryer there is provided a pre-cooler in the primary circuit.

8. Gas drying device according to claim 7, wherein the secondary circuit is connected to the primary circuit at a bifurcation upstream of the cooling dryer.

9. Gas drying device according to claim 8, wherein upstream of the bifurcation a compressor element with at least one stage is provided.

10. Gas drying device according to claim 8, wherein upstream of the bifurcation a compressor element with at least one intercooler is provided.

\* \* \* \* \*